June 9, 1931. A. H. EDGERTON 1,808,947
BRAKE MECHANISM
Original Filed July 15, 1929
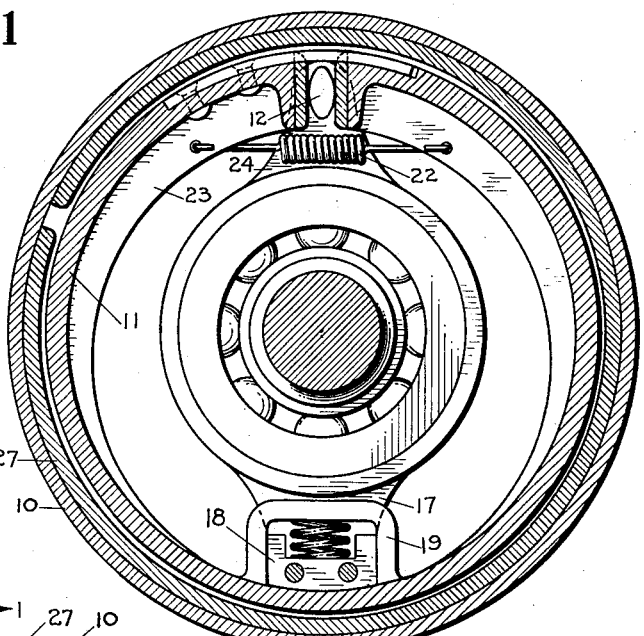
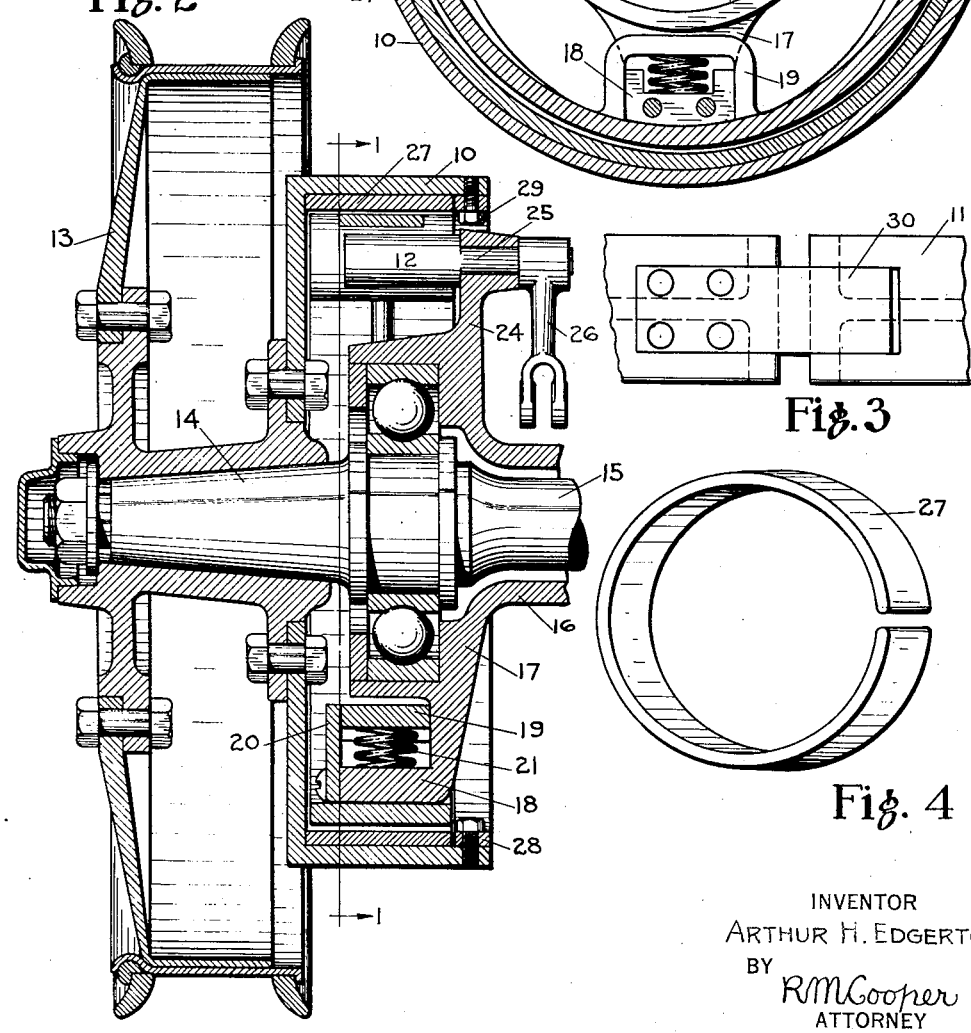
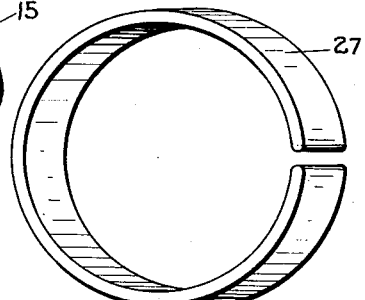
INVENTOR
ARTHUR H. EDGERTON
BY
R.M.Cooper
ATTORNEY Patented June 9, 1931

1,808,947

UNITED STATES PATENT OFFICE

ARTHUR H. EDGERTON, OF LAKEWOOD, OHIO, ASSIGNOR TO THE WHITE MOTOR COMPANY, OF CLEVELAND, OHIO, A CORPORATION OF OHIO

BRAKE MECHANISM

Application filed July 15, 1929, Serial No. 378,351. Renewed March 23, 1931.

This invention relates to improvements in brake mechanisms, and more particularly to improvements in brake mechanisms of the type disclosed in applicant's co-pending applications Numbers 9,225 and 168,081, filed respectively February 14, 1925, and October 24, 1927.

It is an object of this invention to provide a simple and efficient braking mechanism comprising a readily replaceable friction element.

Other objects and features of novelty will be apparent from the following description taken in connection with the accompanying drawings, in which, Figure 1 is a longitudinal vertical section of an automobile brake, the section being taken on a line corresponding to line 1—1 of Figure 2.

Figure 2 is a transverse vertical section of the brake.

Figure 3 is a fragmentary top plan view of the brake shoe, and

Figure 4 is a perspective of the brake friction element.

Referring to the drawings, the brake illustrated comprises generally a brake drum 10, internal brake shoe 11 of the expanding type, and an actuating cam 12.

The brake drum 10 is secured to the rear wheel 13 of an automobile which is mounted in a conventional manner upon the spindle 14 of a drive shaft or axle 15 carried within an axle housing 16.

The brake shoe 11 consists of a flexible annular band, the free ends of which are spaced to accommodate the brake actuating cam 12. It is supported within the drum 10 by means of a depending arm 17 formed on the axle housing 16. As clearly shown, a laterally extending lug 18 on the arm 17 extends within an apertured boss 19 formed on the brake shoe 11, and by means of suitable bearing surfaces which fit closely against the side walls of the receiving aperture prevents rotative movement of the shoe. The shoe is otherwise secured in place by a plate 20 secured to the outer face of the lug 18 and by means of a retractile spring 21 interposed between the lug 18 and the upper wall of the apertured boss 19. As will readily be apparent from the drawing, the spring 21 will permit the necessary radial movement of the adjacent portion of the shoe 11 during actuation of the brake. The free ends of the brake shoe 11 are held in engagement with the actuating cam 12 by means of a contractile spring 22, the opposite ends of which are hooked into apertures formed in the inwardly extending web 23 of the brake shoe.

The actuating cam 12 is supported between the free ends of the shoe 11 by means of an upwardly extending arm 24 formed on the axle housing 16 diametrically opposite the arm 17. It comprises a cylindrical extension 25 journaled in the upper end of the arm 24, and is secured in place by a lever 26 mounted on the outer end of the extension 24.

Interposed between the shoe 11 and brake drum 10, there is a removable friction member 27 supported by the brake drum 10. This friction member is formed of a strip of homogeneous material which is molded or rolled into a non-continuous ring of a diameter slightly larger than that of the brake drum, and, as a result, when assembled within the brake adheres to the brake drum due to its distortion from normal form. The friction member 27 is retained between the shoe and the drum by a ring 28 secured to the inner face of the drum 10 by screws 29.

When it is desired to remove the friction member 27, the lever 26 is disconnected from the vehicular brake actuating mechanism, the screws 29 removed and the ring 28 moved inward along the axle housing 16, after which the friction member can be withdrawn from its positions within the brake and sprung over the axle housing. Replacement of a friction member is effected by reversing the process just described.

Upon application of the brake, the friction element 27 will be engaged by the shoe 11. Since the friction member is held in frictional engagement with the drum 10 by deformation from its normal form, the first increment of frictional resistance will be between the friction member and the shoe, after which slippage will occur between either friction member and the brake drum or the brake shoe or both, depending upon the condition of the friction surfaces of the various members. Engagement of the ends of the friction member with the ends of the shoe 11 is prevented by a plate 30 secured in a slot formed in one end of the shoe and extending into a slot in the other end of the shoe, the upper surface of the plate being flush with the outer surface of the shoe.

Although the foregoing description is necessarily of a detailed character, in order that the invention may be completely set forth, it is to be understood that the specific terminology is not intended to be restrictive or confining, and that various rearrangements of parts and modifications of structural details may be resorted to without departing from the scope or spirit of the invention as herein claimed.

What I claim is:

1. In a brake mechanism, a brake drum, a brake shoe in the form of a split-ring, a floatable friction member interposed between said drum and said shoe, and guiding means conforming to the contour of said shoe carried by one end of said shoe and overlapping the other end of said shoe.

2. In a brake mechanism, the combination of a brake drum, an internal expanding brake shoe in the form of a split-ring, an annular friction strip held in rotatable engagement with the inner face of said drum by the power of its inherent resiliency after being deformed, and guiding means conforming with the contour of said shoe carried by one end of said shoe and overlapping the other end of said shoe.

3. In a brake mechanism, the combination of a brake drum, an internal expanding brake shoe in the form of a split-ring, a floatable friction member interposed between said drum and said shoe, and a guiding plate conforming to the contour of said shoe carried by one end of said shoe and extending into a recess formed in the other end of said shoe.

4. In a brake mechanism, an annular element having a continuous braking surface, a second element in the form of a split-ring, mounted in concentric relation to said first named element, a floating friction member interposed between said elements, and guiding means conforming to the contour of said second element carried by one end of said second element and overlapping the other end of said second element.

5. In a brake mechanism, an annular element having a continuous braking surface, a second element in the form of a split-ring, mounted in concentric relation to said first named element, a floating friction member in the form of a split-ring interposed between said elements and held in engagement with the surface of one of said elements by the power of its inherent resiliency after being deformed, and guiding means conforming to the contour of said second element carried by one end of said second element and overlapping the other end of said second element.

In testimony whereof I hereunto affix my signature this 8th day of July, 1929.

ARTHUR H. EDGERTON.